United States Patent Office
3,366,632
Patented Jan. 30, 1968

3,366,632
N-OXIDES OF 1-HYDROCARBONOXY-2-HYDROXY-
3-MORPHOLINOPROPANES
Reginald L. Wakeman, Philadelphia, Pa., and Zdzislaw J.
Dudzinski, Hasbrouck Heights, N.J., assignors to Millmaster Onyx Corporation, New York, N.Y., a corporation of New York
No Drawing. Filed Aug. 12, 1965, Ser. No. 479,311
3 Claims. (Cl. 260—247.7)

ABSTRACT OF THE DISCLOSURE

N - oxides of 1-hydrocarbonoxy-2-hydroxy-3-morpholinopropanes prepared by treating the tertiaryamine with a peroxide compound. The tertiary amine is prepared by reacting an alcohol with epichlorohydrin to form a chlorohydroxyether. The latter is reacted with the amine. The N-oxides are useful as detergents, detergent additives and textile softeners.

The present invention has for its object the preparation of oxides of tertiary amines which contain both an ether linkage and a hydroxyl group.

The products of this invention correspond to the general formula:

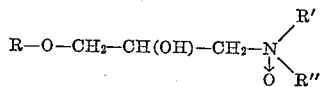

wherein R is an alkyl or alkenyl radical containing from 6 to 34 carbon atoms, R' and R" are either individual hydroxy-alkyl radicals containing from 2 to 4 carbon atoms or members of a morpholine ring, and wherein the oxygen atom is linked to nitrogen by means of a semipolar bond.

In general, the amine oxides of this invention are produced by treating tertiary amines of the structure

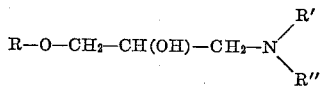

with a peroxide compound such, for example, as ozone, hydrogen peroxide, a peracid such as peracetic acid and the like, or Caro's acid (a solution of potassium persulfate in sulfuric acid). We prefer to use hydrogen peroxide for this purpose.

In general, the amines which are used for the purpose of our invention are prepared by first reacting an aliphatic alcohol containing from 6 to 34 carbon atoms with epichlorohydrin,

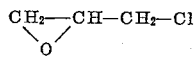

in the presence of a suitable catalyst such as a strong mineral acid like sulfuric acid or a Lewis acid such as zinc chloride, ferric chloride, aluminum chloride, or boron trifluoride. We prefer to use as a catalyst boron trifluoride etherate. By this reaction, a 1-alkyl-2-hydroxy-3-chloropropane is formed according to the following reaction:

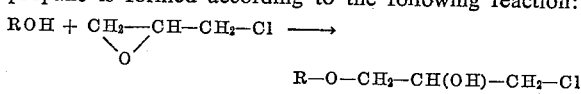

This reaction is readily effected at moderate temperatures ranging from 0° C. to reflux temperature, preferably within the range of 30° C. to 80° C.

The chlorohydroxyether thus formed is then reacted with a secondary amine such as diethanolamine or morpholine. This reaction is carried out at temperatures ranging from 50° C. to 200° C., preferably between 90° C. and 150° C., and can be expressed by the following equation:

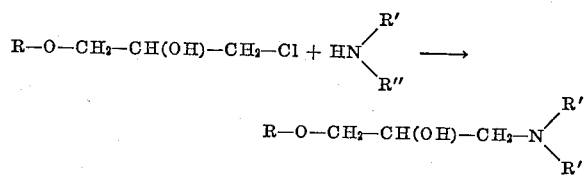

If desired, an acid acceptor such as sodium hydroxide, sodium bicarbonate, sodium carbonate, or the corresponding potassium compounds may be used to facilitate reaction.

In carrying out the process of our present invention, the tertiary amines of the generalized formula given above are preferably reacted with hydrogen peroxide containing from 30% to 50% of hydrogen peroxide dissolved in water. The oxidation is carried out by stirring at slightly elevated temperatures until the reaction mixture becomes homogeneous. Although we prefer to use 30% to 50% hydrogen peroxide, we are not restricted thereby and may use any other desired concentration of this reagent. The temperature of oxidation is preferably between 40° C. and 70° C., although temperatures from about 20° C. to about 100° C. may be employed, if desired. As indicated above, ozone may be used alternatively, if desired. Moreover, where contamination of other organic materials is not a factor and where the contaminating materials may be of themselves beneficial, it is possible to carry out the preparation of these amine oxides by use of certain organic peroxides such, for example, as tertiary butyl hydroperoxide or cumene hydroperoxide. In some instances, peroxides of aliphatic or aromatic acids such as peracetic or perbenzoic acid may also be employed.

Further details of the invention are given in the following illustrative examples.

Example 1

1,000 grams of a technical grade of lauryl alcohol having the following chain length distribution: 3% $C_{10}$, 61% $C_{12}$, 23% $C_{14}$, 11% $C_{16}$, 2% $C_{18}$, were charged into a flask equipped with a mechanical agitator, a reflux condenser and a dropping funnel. 50 grams of epichlorohydrin and 3 grams of boron trifluoride etherate were added, and the mixture was agitated and warmed to 40° C. to 50° C., after which epichlorohydrin amounting to 459 grams more was added during a period of about two hours. It was necessary to cool the flask to maintain this temperature range since the reaction is exothermic.

After all the epichlorohydrin had been added, the reaction mixture was maintained at 45° C. to 50° C. for four hours longer or until the reaction was essentially complete. At this point, the temperature was gradually raised to 70° C. and held for twenty minutes longer while drawing a vacuum of 25", thus stripping off the catalyst.

1,500 grams of 1-lauroxy-2-hydroxy-3-chloropropane were obtained, or 99.5% of the theoretical yield. Its chlorine content was 12.95%, the theoretical being 12.25%.

*Example 2*

By the procedure of Example 1, 1-stearoxy-2-hydroxy-3-chloropropane was obtained by reacting 945 grams of 95% grade stearyl alcohol, 375 grams of epichlorohydrin and 3 grams of boron trifluoride etherate. The product had a chlorine content of 10.35% as against the theoretical 9.45%.

*Example 3*

By the procedure of Example 1, the following 1-alkoxy-2-hydroxy-3-chloropropane derivatives were prepared:

| Product: | Fatty alcohol source |
|---|---|
| 1-myristoxy | 95% myristyl alcohol. |
| 1-cetoxy | 95% cetyl alcohol. |
| 1-octadecenoxy | Ocenol [1] |
| 1-octoxy-decoxy | Alfol 810 [2] |
| 1-arachidoxy-behenoxy | Alfol 2022 [3] |

[1] Registered trademark, E. I. du Pont de Nemours and Company, Inc. Technical Oleyl Alcohol.
[2] Registered trademark, Continental Oil Company. Straight chain saturated fatty alcohols $C_8$–$C_{10}$.
[3] Registered trademark, Continental Oil Company. Straight chain saturated fatty alcohols $C_{20}$–$C_{22}$.

Yields and quality were comparable to those of Examples 1 and 2.

*Example 4*

146 grams of the 1-lauroxy-2-hydroxy-3-chloropropane of Example 1, 55 grams of diethanolamine and 55 grams of anhydrous sodium carbonate were charged into a glass reactor flask equipped with an agitator and a reflux condenser. The charge was heated at 135° C. to 145° C. for two hours until reaction was complete.

The crude product was filtered hot to separate out the inorganic salts. 98% of the theoretical yield of 1-lauroxy-2-hydroxy-3-diethanolaminopropane was obtained, having a combining weight of 354, the theoretical value being 360.

*Example 5*

By the same procedure as in Example 4, the corresponding 1-alkoxy-2-hydroxy-3-diethanolaminopropane derivatives were prepared from the respective 1-alkoxy-2-hydroxy-3-chloropropane derivatives of Examples 2 and 3.

*Example 6*

A three-necked flask equipped with an agitator and a reflux condenser was charged with 276 grams of the 1-lauroxy-2-hydroxy-3-chloropropane of Example 1, along with 348 grams of morpholine and 100 grams of isopropanol. The mixture was heated under reflux with agitation at a temperature of 105° C. for a period of twelve hours. Samples taken at intervals were titrated argentometrically for chloride ion until the titration indicated complete reaction.

The solution was transferred to a separatory funnel wherein it was treated with 135 grams of 30% sodium hydroxide solution and 1,000 grams of water. The liberated 1-lauroxy-2-hydroxy-3-morpholinopropane was separated and heated to remove residual isopropanol and water. A yield of 323 grams was obtained, with a combining weight of 316.

*Example 7*

In a similar manner, 338 grams of the 1-stearoxy-2-hydroxy-3-chloropropane of Example 2 were reacted with 348 grams of morpholine and 100 grams of isopropanol at 108° C. for fourteen hours. 406 grams of 1-stearoxy-2-hydroxy-3-morpholinopropane were obtained, with a combining weight of 446.

*Example 8*

93 grams of the 1-lauroxy-2-hydroxy-3-diethanolaminopropane of Example 4 were charged into a three-necked flask equipped with an agitator, a reflux condenser and a dropping funnel, along with 30 grams of isopropanol. The dropping funnel was charged with 35% hydrogen peroxide. At a temperature of 50° C. to 60° C., 44.5 grams of the hydrogen peroxide were added during four hours until reaction was complete and the product, 1-lauroxy-2-hydroxy-3-diethanolaminopropane - N - oxide, dissolved clear in water. The product assayed 57% active.

*Example 9*

In a manner similar to Example 8, the 1-alkoxy-2-hydroxy-3-diethanolaminopropane derivatives of Example 5 were reacted with hydrogen peroxide in the presence of isopropanol to yield the respective 1-alkoxy-2-hydroxy-3-diethanolaminopropane-N-oxides.

*Example 10*

Using the apparatus described in Example 7, 158 grams of the 1-lauroxy-2-hydroxy-3-morpholinopropane of Example 6 in 50 grams of isopropanol were reacted with 75 grams of 35% hydrogen peroxide added dropwise during four hours at 50° C. to 60° C. On completion of the reaction, the product, 1-lauroxy-2-hydroxy-3-morpholinopropane-N-oxide dissolved clear in water and assayed 57% active.

*Example 11*

223 grams of the 1-stearoxy-2-hydroxy-3-morpholinopropane of Example 7 were reacted with 70 grams of 35% hydrogen peroxide in the presence of 50 grams of isopropanol, as described in Example 10, until the reaction was completed. The product then dissolved clear in water.

*Example 12*

Detergent formulations were prepared employing certain of the amine oxides described above with alkyl benzene sulfonate. These preparations were tested for foam stability at a concentration of 1% of total activity of both ingredients. Controls were similarly prepared, substituting for these amine oxides, three commercially available technical grade alkyl dimethyl amine oxide products, alkyl being respectively lauryl, myristyl and stearyl.

The foam testing procedure was as follows:

100 ml. glass-stoppered graduated cylinders were charged with 5 mm. diameter glass beads to the 10 ml. mark. 10 ml. of the diluted detergent formulae were added, bringing the meniscus to the 16 ml. mark. The stoppered cylinders were shaken back and forth strongly through an arc of about 120° at half-arm's length for twelve cycles. The depth of foam was read at once and at intervals over a period of one hour.

The formulation contained:

| | |
|---|---|
| Amine oxide (100% basis) | 5.0 |
| Ultrawet 35–KX (100% basis) | 16.0 |
| Water to make 100.0. | |

Ultrawet 35–KX,[1] an alkyl benzene sodium sulfonate, was considered to be 32% active; hence, 50 parts was taken. The amine oxides were similarly taken in quantity to yield 5% of active component in the formula. The test dilutions were therefore 1:21.

---
[1] Registered trademark, Atlantic Refining Company.

[Foam stability of 1% active detergent]

| Ex. No. | Alkoxy | Amine | 0 min. | 1 min. | 5 min. | 30 min. |
|---|---|---|---|---|---|---|
| 9 | Cetoxy | DEA | 60 | 60 | 50 | 35 |
| 9 | Stearoxy | DEA | 70 | 70 | 65 | 50 |
| 9 | Myristoxy | DEA | 55 | 55 | 50 | 30 |
| 9 | Octadecenoxy | DEA | 65 | 65 | 50 | 35 |
| 8 | Lauroxy | DEA | 50 | 50 | 40 | 20 |
| 11 | Stearoxy | M | 70 | 70 | 65 | 50 |
| 10 | Lauroxy | M | 60 | 60 | 45 | 30 |
|  | Lauryl dimethyl amine oxide. |  | 70 | 70 | 65 | 50 |
|  | Stearyl dimethyl amine oxide. |  | 70 | 70 | 60 | 40 |
|  | Myristyl dimethyl amine oxide. |  | 70 | 70 | 60 | 40 |

DEA=diethanolamine. M=morpholine.

Example 13

The formulations of Example 12 were modified as follows:

Amine oxide (100% basis) _____ 5.0
Ultrawet 35–KX [1] (100% basis) _____ 16.0
Superamide GR [2] _____ 5.0
Ethyl alcohol _____ 5.0
Water to make 100.0.

[1] Registered trademark, Atlantic Refining Company.
[2] A coconut fatty acid-diethanolamine condensate registered trademark, Millmaster Onyx Corporation.

These compositions were tested as dishwashing compounds by a panel of ten members, who compared their performance with that of a commercially obtainable liquid dishwashing compound in use at home. The consensus rated the above formulation as "Good." The emollient effect was especially noted by seven of the ten.

Example 14

Amine oxide (100% basis) _____ 3.0
Maprofix NH [3] (100% basis) _____ 12.0
Water to make 100.0.

[3] 30% active ammonium lauryl sulfate registered trademark, Milmaster Onyx Corporation.

This mixture was buffered to a pH of 6.5.

The amine oxides were chosen from the above samples 8 through 11, employing respectively or in mixtures of any two, the lauroxy, myristoxy and cetoxy derivatives; the viscosity of the formulations could be varied at will, increasingly in that order.

These made excellent shampoo formulations with antistatic properties; they were clear, stable and of excellent foaming quality.

In addition, the higher homologs such as cetoxy, stearoxy and behenoxy may be substituted in part for the lower homologs to add conditioning qualities.

The amine oxides described above have valuable surface-active properties, which are enhanced over those of the amine oxides of simpler structure, by virtue of the hydroxyl group and the ether group they contain. They are more readily compatible with detergent materials such as alkaryl sulfonates, alkyl sulfate salts and the like, and form more stable solutions in the presence of inorganic salts such, for example, as are used as builders, and also in alkaline or acid solutions.

In their own right, they are effective wetting and dispersing agents, and are active detergents, and may be so used as substitutes for soap and synthetic detergents. In combination with soap, they prevent or reduce the deposition of curd or scum which commonly results from precipitation of insoluble soaps of calcium and magnesium salts present in hard water.

In combination with synthetic detergents such, for example, as the very widely employed salts of alkyl benzene sulfonic acids, the salts of long-chain fatty alcohol sulfuric esters, the higher fatty acid condensates with sarcosine, taurine and the like, as well as detergents of the amphoteric type, they act synergistically to increase their deterging, wetting and dispersing effect.

In detergent mixtures such as dishwashing and laundering preparations, they impart a very desirable emollient effect on the hands, which are often sensitive to the drying effect upon the skin, which is characteristic of most of the synthetic detergents.

In laundering, they impart a pleasing hand to the fabrics which have been washed with detergent mixtures in which they are present as components.

They are effective emulsifying agents.

Their wetting properties render them valuable as levelling agents in dyeing, as well as in other phases of the processing of textiles and related materials such as paper, leather and the like.

They may be used effectively as textile softeners; this is especially the case with the higher molecular weight homologs such as the stearyl and behenyl derivatives.

They are further of use as detergent additives to solvents for dry-cleaning purposes.

We claim:
1. 1-lauroxy-2-hydroxy-3-morpholinopropane-N-oxide.
2. 1-stearoxy-2-hydroxy-3-morpholinopropane-N-oxide.
3. A tertiary amine oxide having the structure:

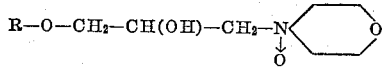

wherein R is a member of the group consisting of alkyl and alkenyl having 6 to 34 carbon atoms.

References Cited

UNITED STATES PATENTS 3,202,714   8/1965   Zimmerer et al. _____ 260—584

ALEX MAZEL, *Primary Examiner.*

N. S. RIZZO, *Examiner.*

J. TOVAR, *Assistant Examiner.*